(12) United States Patent
Stevens

(10) Patent No.: US 10,310,677 B2
(45) Date of Patent: Jun. 4, 2019

(54) ELECTRONIC FINGER TOUCH SIMULATOR FOR CAPACITIVE TOUCH SCREEN DEVICES

(71) Applicant: Andrew Stevens, London (GB)

(72) Inventor: Andrew Stevens, London (GB)

( * ) Notice: Subject to any disclaimer, the term of this patent is extended or adjusted under 35 U.S.C. 154(b) by 24 days.

(21) Appl. No.: 14/673,880

(22) Filed: Mar. 31, 2015

(65) Prior Publication Data

US 2018/0081462 A1 Mar. 22, 2018

(51) Int. Cl.
*G06F 1/16* (2006.01)
*G06F 3/041* (2006.01)
*G06F 3/044* (2006.01)

(52) U.S. Cl.
CPC ............ *G06F 3/044* (2013.01); *G06F 1/1643* (2013.01); *G06F 3/0416* (2013.01)

(58) Field of Classification Search
CPC ....... G06F 3/044; G06F 3/0416; G06F 1/1643
See application file for complete search history.

(56) References Cited

U.S. PATENT DOCUMENTS

| | | |
|---|---|---|
| 2013/0120258 A1 | 5/2013 | Maus |
| 2013/0194202 A1 | 8/2013 | Moberg |
| 2014/0078095 A1 | 3/2014 | Baranov |
| 2015/0235075 A1* | 8/2015 | Rose ..................... G06F 1/3215 382/103 |

FOREIGN PATENT DOCUMENTS

WO 2012/139203 A1 10/2012

OTHER PUBLICATIONS

Combined British Search and Examination Report for application GB 1502676.8 dated Oct. 15, 2015.

* cited by examiner

*Primary Examiner* — Charles V Hicks
(74) *Attorney, Agent, or Firm* — Fleit Gibbons Gutman Bongini & Bianco PL; Paul D. Bianco; Gary S. Winer

(57) ABSTRACT

Fully stand alone and portable capacitive touch screen finger touch simulator clips onto for attachment member for attaching to any capacitive touch screen device, a touch screen engaging conductive material which is provided with an electronically controlled electrical charge through programmed solid state electronics with rechargeable on board battery and no external moving parts—which simulates finger touch.

11 Claims, 4 Drawing Sheets

ELECTRONIC FINGER TOUCH SIMULATOR FOR CAPACITIVE TOUCH SCREEN DEVICES

TECHNICAL FIELD

The technical field relates generally to an electronic device that attaches to a device with a capacitance touch screen, and activates said capacitance touch screen without external moving parts/with no external moving parts.

BACKGROUND

Capacitance touch screen devices are operated by physically touching a touch-sensitive screen, with a finger or via a stylus that is physically moved on to make contact and away to break contact. Capacitive touch screens are used in portable equipment such as mobile telephones, personal digital assistants, and tablet computing devices. The touch input is detected by the devices by detecting the change in capacitance field and monitoring the grid of sensors by a signal processor that tells the device(s) that a touch input event has occurred, and an operation linked to that screen location can occur. This requires the device(s) user to be present when the input is required, and some software applications run on these devices require constant user presence in order to remain/maintain a certain state of operation such as in gaming software applications etc.

Thus, there exists a requirement for the invention of a device that will provide/facilitate a way of applying an (automated) input and repeated inputs to a capacitive touch screen device autonomously when the user is not present, or the user wants/wishes to rest, or to sleep, or has a need to be 'away' (for any reason) and is therefore unable to personally interact with the (capacitive touch screen) device but has a need, desire, or a wish to maintain this (active) status with the (capacitive touch screen) device.

A problem with prior art consists of devices that function using a computer controlled mechanical motor driven, or solenoid driven arm or finger that will move in a contact button to touch and then move away to create the capacitance touch screen input. These devices make a noise due to the moving parts, and do not allow the touch screen device to be moved around and transported while being used with a moving mechanical "finger" device. They often have external wires and power leads that also restrict usage.

Therefore a clear need exists for a device that provides controlled autonomous touch inputs without any external moving parts and is powered by an internal rechargeable battery. The device can quickly and easily attached to a capacitance touch screen device so it is held in place for ease of movement and transportation.

BRIEF DESCRIPTION OF THE DRAWINGS

The accompanying figures, where similar reference numerals shown inside [ ] refer to identical of functionally similar elements in throughout the different figures showing different views and cut away sections, together with the description serve to illustrate various embodiments and features with the present invention.

DESCRIPTION OF THE EMBODIMENTS OF THE INVENTION

Figure 1A:
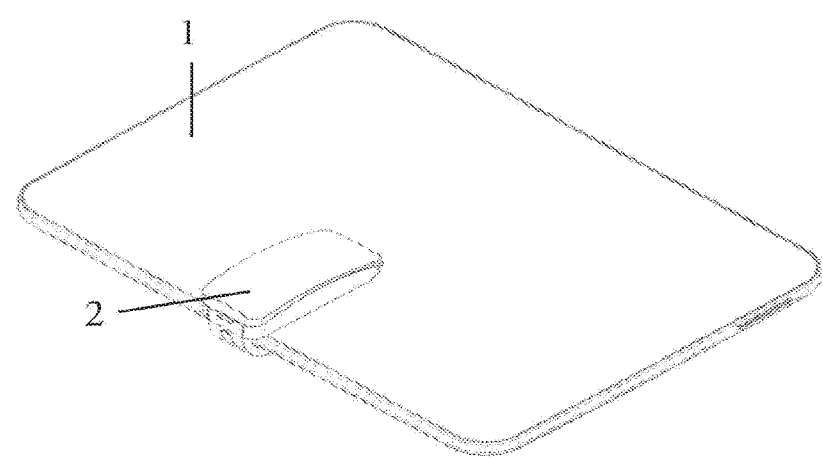
FIGS. 1A and 1B illustrate the device fitted to a capacitance touch screen 15 device.
Figure 1B:
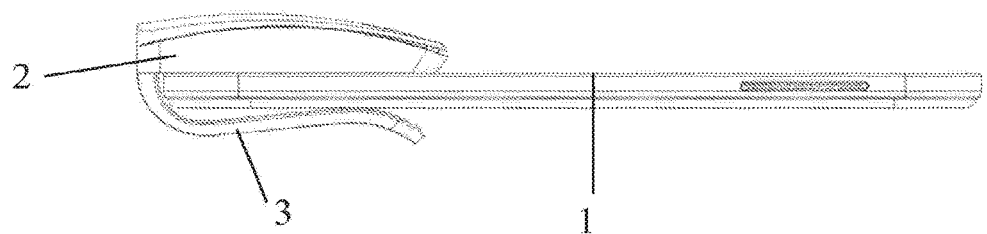
Figure 2A:
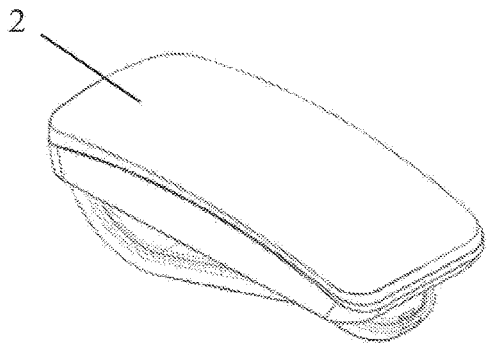
FIGS. 2A-2E show views of the device from different directions.
Figure 2D:
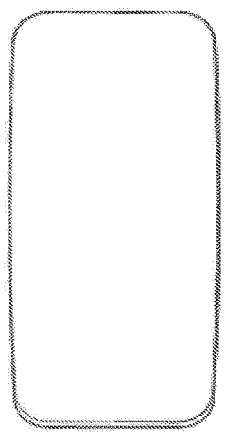
Figure 2B:
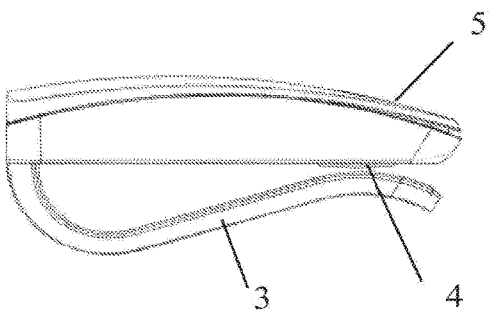
Figure 2E:
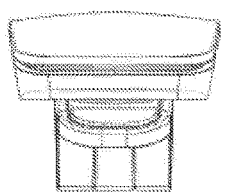
Figure 2C:
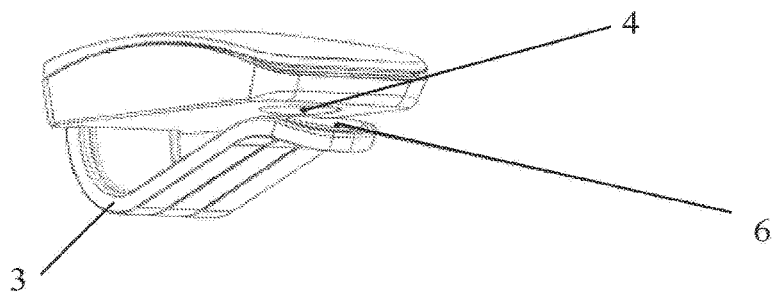
Figure 3:
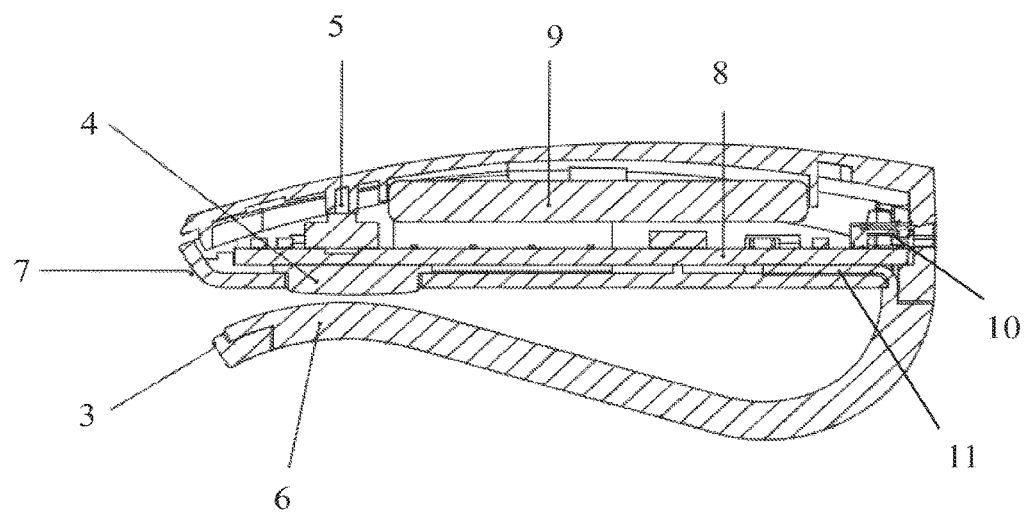
FIG. 3 shows a cross section to show internal components.
Figure 4:
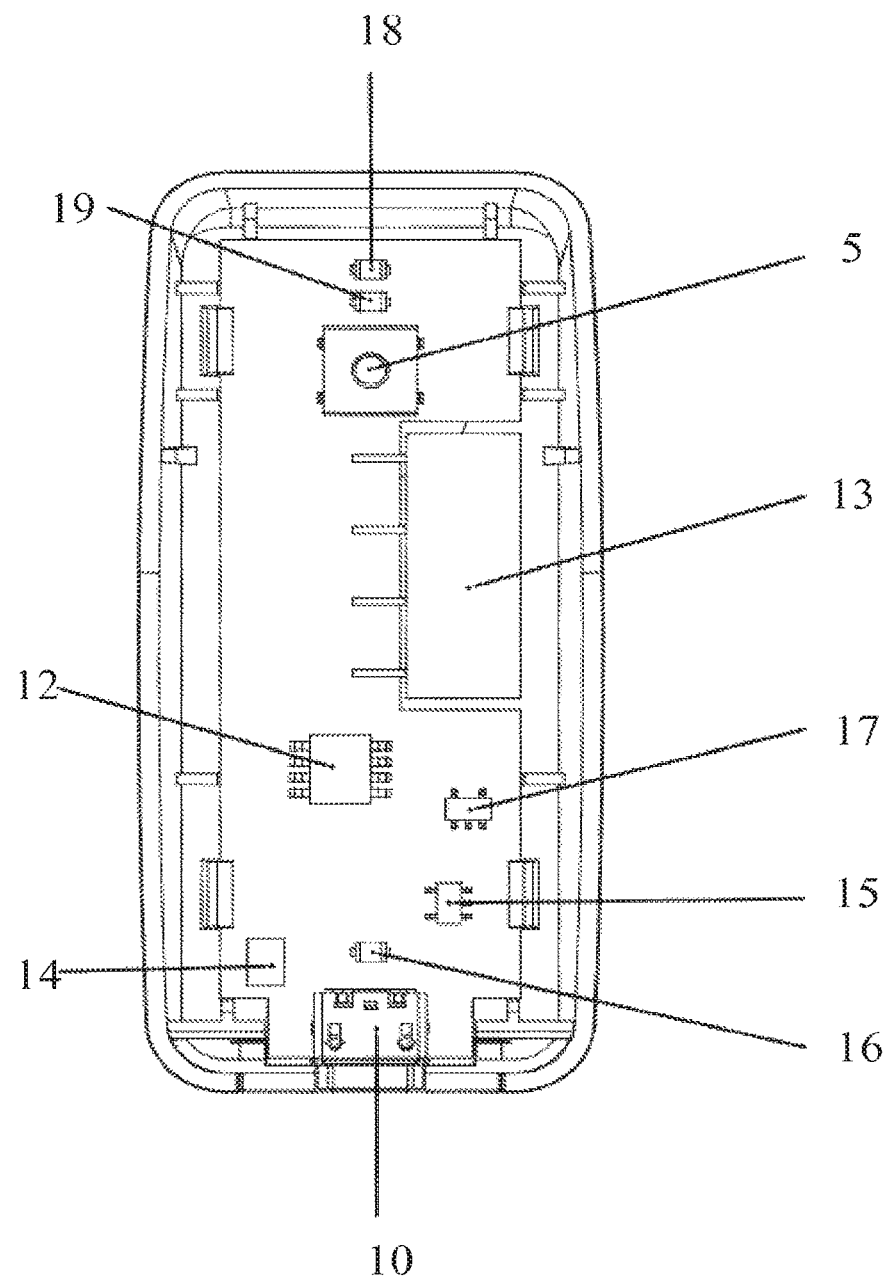
FIG. 4 shows details of the key electronic components with the case opened.

The invention is an electronic device as shown in FIGS. 1 to 4 with an external plastic moulded case [2] that can be clipped onto a capacitance touch screen device [1]. This external case could be shaped and formed in other ways by those skilled in the art. It is held in place with an integral clip [3] that can expand and contract as required to fit with different devices. Other means of attachment are contemplated by the invention and may or may not incorporate a suction/vacuum method. The case [2] has a profiled front edge [7] and the profiled front edge of the clip [3] help the product to be easily installed on different sizes of capacitance touch screen device [1].

The touch screen [1] creates a uniform electrostatic field when it is touched by a human fingerpart of that electrical charge is dissipated to the finger, and the device [2] also provides a route to dissipate an electrical charge from the capacitance touch screen and therefore creates voltage drop which is detected by the capacitance touch screen devices input controller which is then used to control a software application running on that device. This is referred to as a touch event, when the finger is removed the electrostatic charge is no longer dissipated so the touch event ends. The internal electronics circuit board [8] is used to also break the conductive path of this dissipated electrostatic charge.

The electronic device has a switch [5] to turn on with a short press and turn off the device with a long press or other similar configurations can be used to activate the device. When the unit is turned on or off the user is given feedback from the microprocessor by a number of status Light emitting diodes (LED) indicators [16] [18] [19].

Once the device has been turned on using the switch [5] the microprocessor [12] or similar electronic control system, is used to operate an electronically controlled switch element such as a relay [13], which may also be understood to be a relay electronic switch, or similar electronic switching component with low internal capacitance coupling. This then makes a connection between a conductive rubber pad [4], which may also be understood to be a contact pad, and the negative terminal of the battery [9] and the conductive rubber clip insert [6]. The conductive clip insert [6] connects to the ground plane of the device [11] and this improves capacitance touch screen [1] activation as it increases the electrostatic discharge. The relay [13] makes a connection from the conductive rubber pad [4] and it creates a path for the electrostatic charge discharge at the screen to occur. This change is detected by the capacitance touch screen device [1] and creates a touch action. The circuit board [8] and conductive rubber pad [4] are designed to minimise the electrostatic dissipation load when they are not connected to the device [2] negative ground plane via the relay or similar device to the devices internal negative battery ground plane, this ensures the devices can make a detected touch input and also end the touch input as required.

The control electronics is operated by an internal rechargeable battery [9] that is connected to a circuit board [14] that uses, a charging connection socket [10], which works with a charge 30 control integrated circuit [15], and lights a charging status light [16]. A voltage measuring integrated circuit [17] is used to warn the user of the device of low battery so to alert the product requires charging before it can be used to reliably operate.

The surface of the one or more conductive rubber pad [4] may be profiled and textured to vary its performance on different capacitance touch screen surfaces, to reduce the area in contact to improve the device's free floating charged state.

The microprocessor [12] or similar device can be programmed to alter the rate of touch activations and can be used to randomize the time between touch events. The control system could be activated by a sensor input triggered by light or temperature or other electronic input signal to then operate the device according to the inputs and the selected operation mode of the microprocessor and or control system software or operation.

The invention claimed is:

1. An electronic device comprising: an integrated flexible sprung clip; one or more conductive contact pads; and an electronic circuit; wherein the flexible sprung clip is configured to hold the one or more conductive contact pads permanently against a capacitance touch screen, and the electronic device is arranged such that the electrical charge dissipation rate of the one or more conductive contact pads is controlled by the electronic circuit, to autonomously simulate human finger contact at, and thus human usage of the capacitance touch screen.

2. The electronic device of claim 1, further comprising a conductive clip insert, electrically connected to the one or more conductive contact pads.

3. The electronic device of claim 1, further comprising a timing circuit which controls the timing of the modification of the electrical charge dissipation rate at the one or more conductive contact pads.

4. The electronic device of claim 3, wherein the timing circuit is controlled by a microprocessor, in response to an external input signal from at least one of a user-operable switch and a sensor.

5. The electronic device of claim 1, further comprising a rechargeable internal battery.

6. The electronic device of claim 1, further comprising one or more tapered ramps to allow attachment to the capacitance touch screen.

7. The electronic device of claim 1, further comprising a control switch for activating and deactivating the device.

8. The electronic device of claim 1, wherein the one or more conductive contact pads has a profiled and textured contact surface.

9. The electronic device of claim 8, wherein the one or more conductive contact pads has a moulded profiled surface, including concentric rings to simulate a human finger.

10. A method of simulating human finger contact on a capacitance touch screen, the method comprising the steps of: a) providing an electronic device comprising: an integrated flexible sprung clip, one or more conductive contact pads, and an electronic circuit; b) configuring the electronic device to change the electrical charge dissipation rate of the one or more conductive contact pads according to a predetermined sequence when activated; c) attaching the electronic device to the capacitance touch screen via the flexible sprung clip; and d) activating the electronic device.

11. The method of claim 10, wherein the predetermined sequence is pseudorandom.

* * * * *